United States Patent [19]

Kurosawa

[11] Patent Number: 4,835,476

[45] Date of Patent: May 30, 1989

[54] VOLTAGE MEASURING SHEET

[75] Inventor: Kunisaku Kurosawa, Tokyo, Japan

[73] Assignee: Three TEC Davis Inc., Tokyo, Japan

[21] Appl. No.: 936,077

[22] Filed: Nov. 28, 1986

[51] Int. Cl.⁴ ............................................. G02F 1/01
[52] U.S. Cl. .................................... 324/435; 324/426
[58] Field of Search ............... 324/435, 106, 104, 426; 350/330, 331 R, 350 R, 351

[56] References Cited

U.S. PATENT DOCUMENTS

| | | | |
|---|---|---|---|
| 3,524,726 | 4/1968 | De Koster | 324/106 |
| 4,006,414 | 2/1977 | Parker | 324/106 |
| 4,051,435 | 9/1977 | Fanslow | 324/106 |
| 4,702,564 | 10/1987 | Parker | 324/104 |

Primary Examiner—A. D. Pellinen
Assistant Examiner—Leon K. Fuller
Attorney, Agent, or Firm—Wenderoth, Lind & Ponack

[57] ABSTRACT

A voltage measuring sheet which is capable of qualitatively measuring the existing strength of condition of batteries has an electrically conductive layer and a temperature-sensitive decoloring type coloring layer which are provided on a transparent substrate. The sheet further has contacts defined by the conductive layer which are brought into contact with two electrodes, respectively, of a battery which is to be measured. In addition, a scale pattern is disposed underneath the coloring layer. Thus, it is possible to simplify the arrangement and hence production of the sheet and facilitate the reading of indication on the sheet.

3 Claims, 1 Drawing Sheet

VOLTAGE MEASURING SHEET

BACKGROUND OF THE INVENTION

1. Field of the Invention

The present invention relates to a voltage measuring sheet which is capable of qualitatively measuring the voltage output or existing strength of batteries and which has a simplified structure and no moving parts.

2. Description of the Related Art

The extent of the use of small batteries, particularly dry cell batteries has increased rapidly and steadily with the diversified development of electric and electronic products. There is really no end to the list of devices that employ batteries as their energy sources, e.g., portable radios, televisions, cassette decks, tape recorders, etc., timepieces, cameras and various kinds of toy. Batteries are generally stored while being set in such devices. Therefore, there are cases where an electric or electronic device is continuously used without testing the existing strength or condition of the battery set therein, resulting in a failure of operation during use due to lack of voltage. It may be necessary in order to avoid such problem to replace the battery with a new one at the time of contemplated use, which involves a substantial waste of useful battery life.

Testers are generally employed as voltage measuring devices but they are bulky and cumbersome as devices which are frequently used to test the charge state or condition of batteries such as those of the 1.5 and 9 volt dry cell types. Accordingly, almost no testers are actually used for such purposes.

U.S. Pat. No. 4,006,414 discloses a current indicating device wherein a temperature-sensitive coloring liquid crystal layer is provided on an electrically conductive layer carried by a substrate such that the liquid crystal layer senses qualitatively heat which is generated by a part of the conductive layer when a power supply is connected thereto.

The applicant of the present invention has already proposed in Japanese Patent Application No. 93838/1986 and Japanese Utility Model Application No. 67931/1986 a voltage measuring sheet wherein an electrically conductive layer and a temperature-sensitive coloring liquid crystal layer are provided on a substrate, and two electrodes of a battery which is to be measured are brought into contact with two ends, respectively, of the conductive layer to cause portions thereof to generate heat which in turn causes the liquid crystal layer to change in color through a length corresponding to the voltage output or existing strength of the battery under test.

The above-described liquid crystal type voltage measuring sheet suffers from the following problems. Since the liquid crystal layer is coated on a background layer which is printed in dark or black, scale pattern for qualitatively indicating the existing strength of batteries must be printed on the surface of the sheet in such a manner that the pattern is spaced apart from the background and liquid crystal layers and extends parallel to the liquid crystal layer. Accordingly, it is necessary for the user of the device to determine the condition of the battery by checking the length of a portion of the liquid crystal layer which has changed in color against the scale pattern which is spaced apart from the liquid crystal layer.

The present invention aims at eliminating the need to provide the above-described background layer and facilitating the reading of indication of the existing strength or condition of batteries as well as simplifying the display design by printing a scale pattern underneath a temperature-sensitive decoloring type coloring layer which changes color and becomes transparent substantially proportional to the voltage output or existing strength of the battery under test.

SUMMARY OF THE INVENTION

Accordingly, it is a primary object of the present invention to provide a voltage measuring sheet designed so that the reading of indication of the existing strength or condition of batteries is facilitated and the production of the sheet is simplified.

To this end, the present invention provides a voltage measuring sheet comprising: an electrically conductive layer and a temperature-sensitive decoloring type coloring layer which are provided on a transparent substrate; contacts defined by the conductive layer which are brought into contact with two electrodes, respectively, of a battery which is to be measured; and a scale pattern provided underneath the coloring layer.

Examples of substrates which may be employed in the present invention include polyester, polycarbonate, polysulfone, polyamide, cellulose, paper, synthetic paper, polymer sheet having high thermal stability, etc. The most preferable material is relatively thin flexible transparent film.

The electrically conductive layer employed in the present invention may be made of silver, nickel, iron, copper, carbon, lead, etc. alone or in combination. It is most preferable to employ such material in the form of an electrically conductive ink. More specifically, it is preferable to disperse a selected material in epoxy or urethane and apply it to the surface of the substrate by printing, painting, transfer coating or other similar means.

A coloring agent which may be employed in the present invention to provide a temperature-sensitive decoloring type coloring layer needs to show a change in color in response to a temperature change. More specifically, a coloring agent which becomes bluish at room temperature and becomes transparent at 40° C. is prepared by mixing together crystal violet lactone (CVL) as a dye, nonyl phenol as a developer, and N-myristyl alcohol as a wax.

The above and other objects, features and advantages of the present invention will become more apparent from the following description of the preferred embodiment thereof, taken in conjunction with the accompanying drawings.

DESCRIPTION OF THE PREFERRED EMBODIMENT

The present invention will be described hereinunder in detail by way of one embodiment and with reference to the accompanying drawings.

Figure 1:
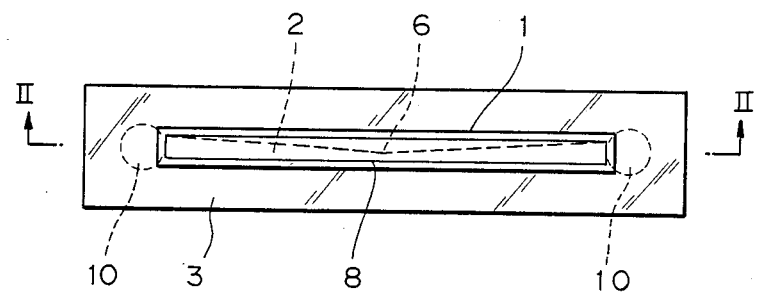
FIG. 1 is a plan view showing the obverse side of one embodiment of the voltage measuring sheet according to the present invention.
Figure 2:
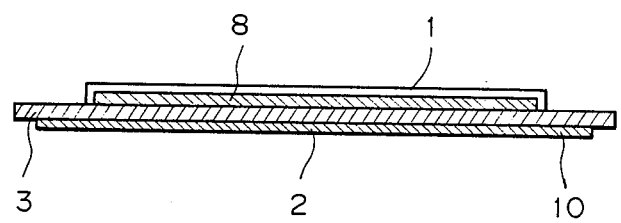
FIG. 2 is a sectional view taken along the line II—II in FIG. 1.

Referring to FIGS. 1 and 2, which show in combination one embodiment of the voltage measuring sheet according to the present invention, a temperature-sensitive decoloring type coloring layer 1 is provided on the obverse surface of a transparent substrate 3, and an electrically conductive layer 2 is provided on the reverse surface of the substrate 3. A scale pattern or voltage graduation 8 is provided on the basis of the predetermined relationship between voltage and the length of a decolored portion of the coloring layer 1.

The conductive layer 2 has a substantially beltlike shape with a narrowed central portion 6. Two longitudinal ends of the conductive layer 2 define terminals 10 which are brought into contact with two electrodes, respectively, of a battery which is to be measured. A transparent protective film (not shown) may be provided on the conductive layer 2, and in such case also the terminals 10 are exposed for the purpose of contact with the electrodes of a battery to be tested.

In the voltage measuring sheet according to the present invention, it is possible to variously change the disposition of the coloring layer 1 and the conductive layer 2 with respect to the substrate 3 and the order in which these constituent elements are stacked. For example, when only one surface of the transparent substrate 3 is used, the coloring layer 1, the scale pattern 8 and the conductive layer 2 may be stacked in that order so that a change in color of the coloring layer 1 is observed through the substrate 3. Further, the configuration of the substrate 3 itself may be made coincident with the pattern of the conductive layer 2.

In actual use of the voltage measuring sheet arranged as detailed above, the sheet is effectively handled utilizing its flexibility. More specifically, in the case of a battery having two electrodes which are flush with each other such as a 9 volt dry cell battery, the two terminals 10 of the sheet are brought into contact with the electrodes, respectively, of the battery, whereas, in the case of a battery having two electrodes which are respectively disposed at opposite ends of the battery such as a 1.5 volt dry cell battery and a flat pellet type cell, the sheet is curved arcuately in such a manner that the conductive layer 2 is inside the arcuated sheet to allow the terminals 10 to come in contact with the battery electrodes.

When current flows through the conductive layer 2, generation of heat starts from a narrowed portion of the layer 2, and the heat generating area spreads gradually until the length of the heat generating area reaches a value corresponding to the voltage output or existing strength of the battery under test. The heat thus generated is transferred to the coloring layer 1, and the layer 1 is decolored through a length equal to the length of the heat generating area of the conductive layer 2. Accordingly, it is possible to know the existing strength or condition of the battery by measuring the length of the decolored portion of the coloring layer 1 against the scale pattern 8.

As has been described above, the present invention enables a sheet type voltage measuring device to be readily produced and permits facilitation of the reading of indication on the device with a considerably simple arrangement, thus providing great practical advantages.

Although the present invention has been described through specific terms, it should be noted here that the described embodiment is not necessarily exclusive and various changes and modifications may be imparted thereto without departing from the scope of the invention which is limited solely by the appended claim.

What is claimed is:

1. A voltage measuring sheet consisting essentially of:
   a substrate;
   a first layer of an electrically conductive material provided on a portion of said substrate;
   a second layer of a temperature-sensitive decoloring type coloring agent provided on a portion of said substrate; and
   a scale pattern disposed underneath said second layer of coloring agent, whereby the heat generated in the first layer of conductive material causes a change in color of the second layer of the coloring agent so as to be observed through the substrate.

2. A voltage measuring sheet according to claim 1, particularly designed to test the strength of batteries, in which the substrate is transparent and the temperature-sensitive decoloring agent changes color by becoming transparent substantially proportional to a voltage output of the battery tested.

3. A voltage measuring sheet according to claim 2 where the second layer of temperature-sensitive decoloring agent consists essentially of a mixture of a crystal violet lactone dye, a nonyl phenol developer and N-myristyl alcohol as a wax, whereby the decoloring agent has a bluish color at room temperature and becomes transparent at 40° C.

* * * * *

UNITED STATES PATENT AND TRADEMARK OFFICE
CERTIFICATE OF CORRECTION

PATENT NO. : 4,835,476

DATED : May 30, 1989

INVENTOR(S) : Kunisaku KUROSAWA

It is certified that error appears in the above-identified patent and that said Letters Patent is hereby corrected as shown below:

Column 4, line 33:

Claim 1, last line, change "substrate" to -- second layer --.

Signed and Sealed this

Twenty-eighth Day of July, 1992

Attest:

DOUGLAS B. COMER

*Attesting Officer*  *Acting Commissioner of Patents and Trademarks*